US012695990B2

(12) United States Patent
Obana et al.

(10) Patent No.: US 12,695,990 B2
(45) Date of Patent: Jul. 28, 2026

(54) EYE TRACKING VALIDATION USING ROBOT EYE SYSTEM

(71) Applicant: Sony Interactive Entertainment Inc., Tokyo (JP)

(72) Inventors: Koichi Obana, San Mateo, CA (US); Yuichiro Nakamura, San Mateo, CA (US); Andrew Young, San Mateo, CA (US); Frank Zhao, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 82 days.

(21) Appl. No.: 18/486,957

(22) Filed: Oct. 13, 2023

(65) Prior Publication Data

US 2025/0126361 A1     Apr. 17, 2025

(51) Int. Cl.
*H04N 23/695* (2023.01)
*B25J 11/00* (2006.01)

(52) U.S. Cl.
CPC ........ *H04N 23/695* (2023.01); *B25J 11/0015* (2013.01)

(58) Field of Classification Search
None
See application file for complete search history.

(56) References Cited

U.S. PATENT DOCUMENTS

2012/0212594 A1* 8/2012 Barnes ................. G09B 21/008
                                                        348/E7.085
2014/0198382 A1   7/2014 Chen et al.

| | | | |
|---|---|---|---|
| 2016/0082598 A1 | 3/2016 | Anducas Aregall et al. | |
| 2016/0342206 A1 | 11/2016 | Shazly et al. | |
| 2018/0249051 A1 | 8/2018 | Send et al. | |
| 2018/0370032 A1* | 12/2018 | Ichikawa | B25J 11/0015 |
| 2020/0391382 A1* | 12/2020 | Burgess | B25J 9/1664 |
| 2020/0406468 A1* | 12/2020 | Stoianovici | B25J 11/0005 |
| 2020/0409458 A1* | 12/2020 | Smithwick | A61B 3/103 |
| 2022/0093000 A1* | 3/2022 | Munich | G06F 16/90332 |
| 2022/0094254 A1* | 3/2022 | Wei | B25J 19/023 |
| 2022/0258337 A1* | 8/2022 | Huang | G05B 13/042 |
| 2022/0407994 A1* | 12/2022 | Zhang | G02B 3/0037 |
| 2024/0022819 A1* | 1/2024 | Smits | H04N 23/45 |
| 2024/0335942 A1* | 10/2024 | Zhao | B25J 9/1664 |
| 2025/0044863 A1* | 2/2025 | Shanidze | G06F 3/013 |

OTHER PUBLICATIONS

"International Search Report and Written Opinion", dated Dec. 26, 2024, from the counterpart PCT application PCT/US24/50371.

* cited by examiner

*Primary Examiner* — Stefan Gadomski

(74) *Attorney, Agent, or Firm* — Kilpatrick Townsend & Stockton LLP

(57) ABSTRACT

A robot eye and two different eye tracking systems may be used in tandem to determine the accuracy of eye tracking software that is used as part of one of the eye tracking systems. If inaccurate, the eye tracking software may then be adjusted in response. In various example embodiments, a camera may be used in one of the eye tracking systems to then track movement of the robot eye using the eye tracking software itself. Also in various example embodiments, the other eye tracking system may include components such as magnetic sensors, optical sensors like CMOS sensors, and/or lasers for tracking the same movement of the robot eye.

20 Claims, 9 Drawing Sheets

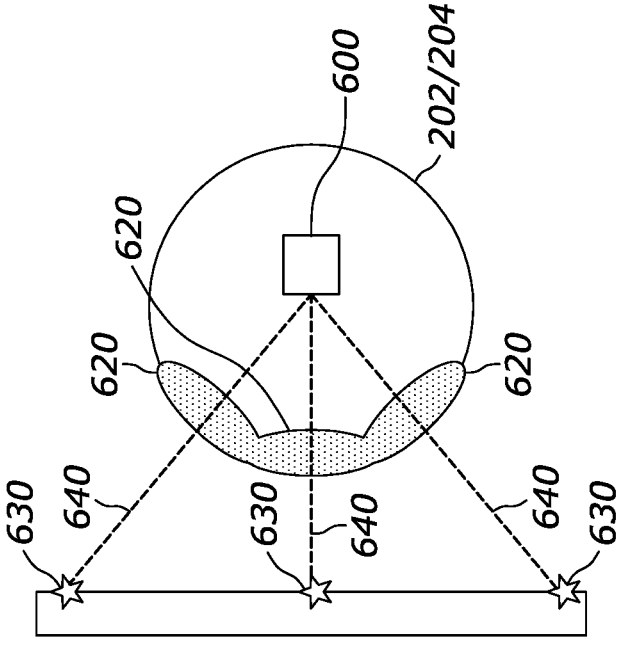
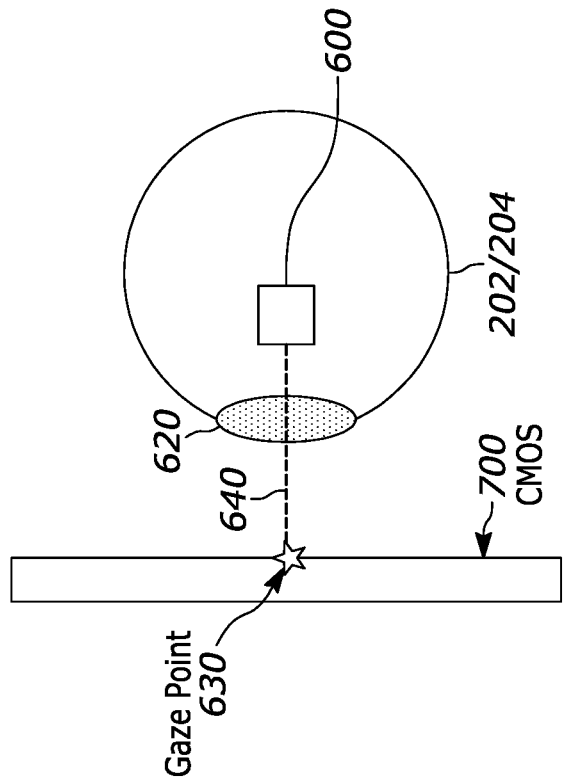
FIG. 7

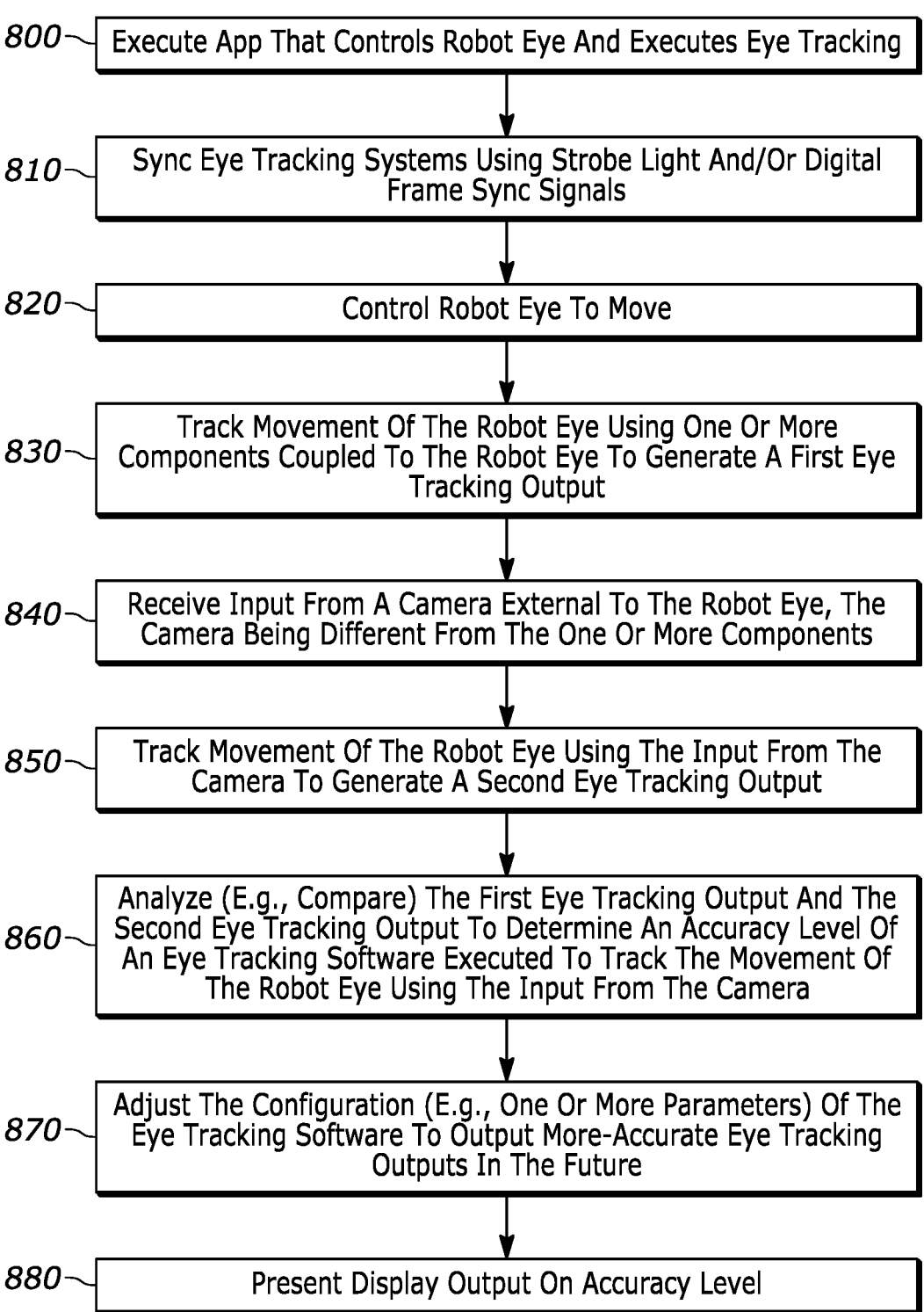

800 — Execute App That Controls Robot Eye And Executes Eye Tracking

810 — Sync Eye Tracking Systems Using Strobe Light And/Or Digital Frame Sync Signals 820 — Control Robot Eye To Move 830 — Track Movement Of The Robot Eye Using One Or More Components Coupled To The Robot Eye To Generate A First Eye Tracking Output 840 — Receive Input From A Camera External To The Robot Eye, The Camera Being Different From The One Or More Components 850 — Track Movement Of The Robot Eye Using The Input From The Camera To Generate A Second Eye Tracking Output 860 — Analyze (E.g., Compare) The First Eye Tracking Output And The Second Eye Tracking Output To Determine An Accuracy Level Of An Eye Tracking Software Executed To Track The Movement Of The Robot Eye Using The Input From The Camera 870 — Adjust The Configuration (E.g., One Or More Parameters) Of The Eye Tracking Software To Output More-Accurate Eye Tracking Outputs In The Future 880 — Present Display Output On Accuracy Level

EYE TRACKING VALIDATION USING ROBOT EYE SYSTEM

FIELD

The disclosure below relates generally to eye tracking validation using a robot eye system.

BACKGROUND

As recognized herein, electronic eye tracking can be used to determine where a user is looking for a variety of different computer-based applications. These applications include augmented reality and virtual reality experiences, computer gaming, user interface input and navigation, biometric authentication, automotive and aeronautical simulations, electronic sports, tracking the reading of electronic content, and many others.

As also recognized herein, electronic devices can malfunction or otherwise have their operations adversely affected by inaccurate eye tracking software. However, there are currently no adequate technical solutions to validating the accuracy of the eye tracking software before implementing it in certain applications like those discussed above.

SUMMARY

Accordingly, in one aspect an apparatus includes a processor assembly programmed with instructions to control a robot eye to move. The processor assembly is also programmed to track movement of the robot eye using one or more components coupled to the robot eye to then generate a first eye tracking output. The processor assembly is also programmed with instructions to receive input from a camera external to the robot eye, where the camera is different from the one or more components. The processor assembly is further programmed with instructions to track movement of the robot eye using the input from the camera to generate a second eye tracking output. The processor assembly is then programmed to compare the first eye tracking output to the second eye tracking output to determine an accuracy level of an eye tracking system that is executed to track the movement of the robot eye using the input from the camera.

In various examples, the processor assembly may be programmed with instructions to present an output on a display, where the output may indicate the accuracy level. Additionally or alternatively, the processor assembly may be programmed with instructions to, based on the determination, adjust one or more parameters of the eye tracking system.

In some example implementations, the one or more components may include magnetic sensors. In particular examples, the magnetic sensors may include at least three magnetic sensors disposed around the robot eye. The magnetic sensors may include tunnel magneto-resistance (TMR) sensors and/or other types of magnetic sensors such as Hall effect sensors.

Additionally or alternatively, the one or more components may include an optical sensor different from the camera. If desired, the optical sensor may be disposed rearward of the robot eye. The optical sensor may be a complementary metal oxide semiconductor (CMOS) sensor, for example. Also in some cases, the robot eye may include a textured pattern trackable via the optical sensor.

As yet another example that may be used in addition to or in lieu of the foregoing, the one or more components may include a laser. In some cases, the laser may be disposed within the robot eye. In addition, the one or more components may also include one or more optical sensors that track light from the laser, such as one or more complementary metal oxide semiconductor (CMOS) sensors in particular.

What's more, in some example embodiments the processor assembly may be programmed to use one or more digital frame sync signals to synchronize the tracking of the movement of the robot eye via the one or more components with the tracking of movement of the robot eye via the input from the camera. Additionally or alternatively, the processor assembly may be programmed with instructions to use a strobe light to synchronize this tracking of the movement of the robot eye.

In addition, in some examples the apparatus may include the robot eye. In specific examples, the apparatus may include not just the robot eye but a mechanized head that itself includes the robot eye.

In another aspect, a method controlling, using an electronic system, an artificial eye to move. The method also includes tracking, using the electronic system, movement of the artificial eye using one or more components coupled to the artificial eye to generate a first eye tracking output. The method then includes receiving, using the electronic system, input from a camera external to the artificial eye, with the camera being different from the one or more components. The method further includes tracking, using the electronic system, movement of the artificial eye using the input from the camera to generate a second eye tracking output. The method then includes analyzing, using the electronic system, the first eye tracking output and the second eye tracking output to determine an accuracy level of eye tracking software that is executed to track the movement of the artificial eye using the input from the camera. The method also includes adjusting, based on the determination and using the electronic system, the configuration of the eye tracking software to output more-accurate eye tracking outputs in the future.

In still another aspect, a system includes at least one computer storage that is not a transitory signal. The computer storage includes instructions executable by at least one processor to control an artificial eye to move. The instructions are also executable to track movement of the artificial eye using one or more components to generate a first eye tracking output. The instructions are further executable to receive input from a camera, where the camera is different from the one or more components. The instructions are then executable to track movement of the artificial eye using the input from the camera to generate a second eye tracking output. The instructions are further executable to analyze the first eye tracking output and the second eye tracking output to determine an accuracy level of eye tracking software that is executed to track the movement of the artificial eye using the input from the camera. The instructions are then executable to adjust, based on the determination, a parameter of the eye tracking software.

The details of the present application, both as to its structure and operation, can be best understood in reference to the accompanying drawings, in which like reference numerals refer to like parts, and in which:

BRIEF DESCRIPTION OF THE DRAWINGS

FIGS. 6 and 7 show different examples where a laser within each robot eye may be used to validate an optical eye tracking system consistent with present principles;

FIG. 8 shows example logic in example flow chart format that may be executed by a processor assembly to validate an optical eye tracking system consistent with present principles.

DETAILED DESCRIPTION

Figure 1:
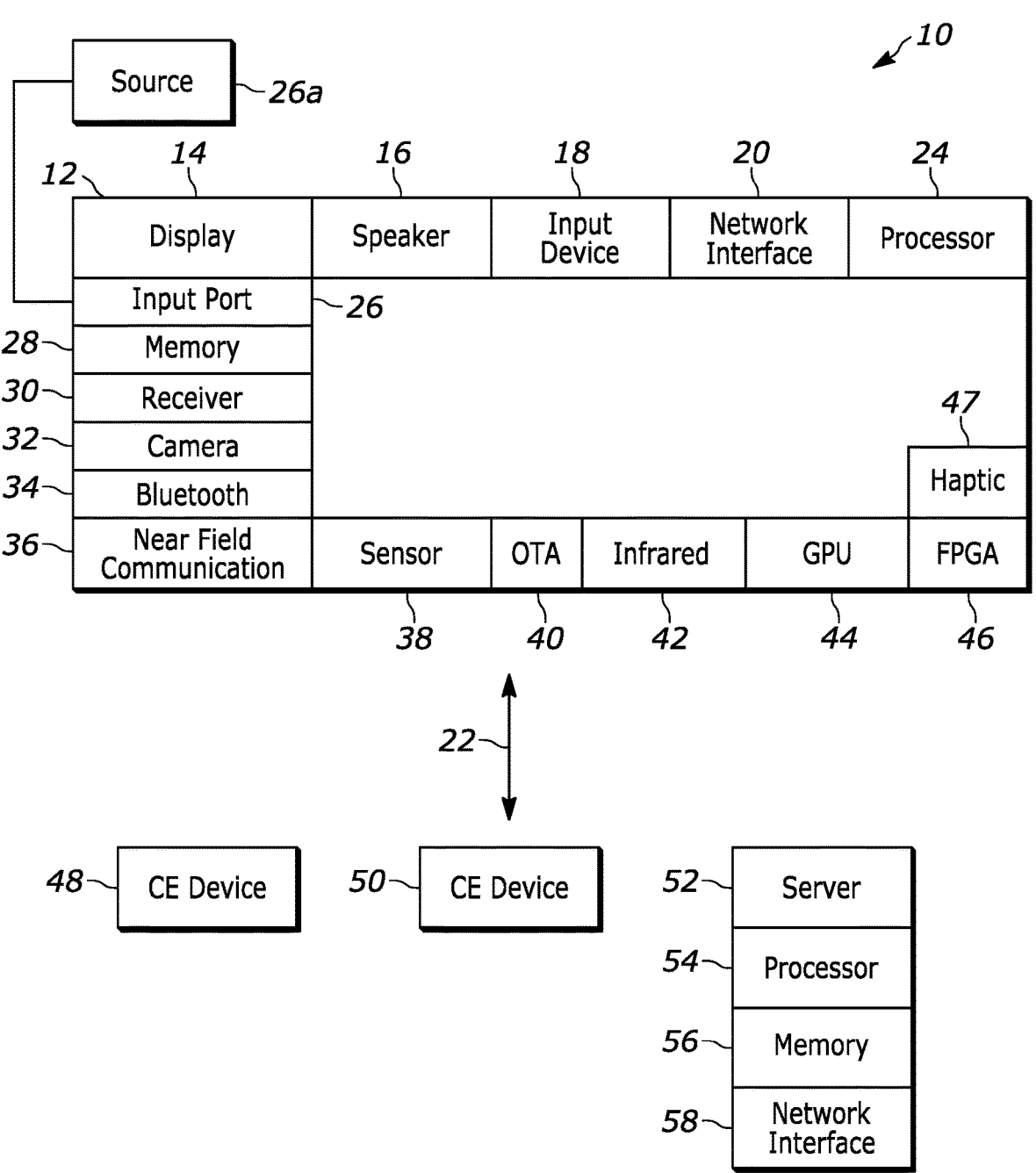
FIG. 1 is a block diagram of an example computing system consistent with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implements methods of providing a secure community such as an online social website to network members.

A processor may be a single- or multi-chip processor that can execute logic by means of various lines such as address lines, data lines, and control lines and registers and shift registers. A processor assembly may include one or more processors acting independently or in concert with each other to execute an algorithm, whether those processors are in one device or more than one device.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Present principles may employ machine learning models, including deep learning models. Machine learning models use various algorithms trained in ways that include supervised learning, unsupervised learning, semi-supervised learning, reinforcement learning, feature learning, self learning, and other forms of learning. Examples of such algorithms, which can be implemented by computer circuitry, include one or more neural networks, such as a convolutional neural network (CNN), recurrent neural network (RNN) which may be appropriate to learn information from a series of images, and a type of RNN known as a long short-term memory (LSTM) network. Support vector machines (SVM) and Bayesian networks also may be considered to be examples of machine learning models.

As understood herein, performing machine learning involves accessing and then training a model on training data to enable the model to process further data to make predictions. A neural network may include an input layer, an output layer, and multiple hidden layers in between that are configured and weighted to make inferences about an appropriate output.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a USB port to physically connect to another CE device and/or a head-phone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command), providing input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics generators 47 may be provided for generating tactile signals that can be sensed by a person holding or in contact with the device.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1. The user interfaces (UI) described herein may be consolidated, expanded, and UI elements may be mixed and matched between UIs.

With the foregoing in mind, present principles recognize that optical eye tracking with digital cameras might be less than accurate in some circumstances. However, optical eye tracking still provides numerous technological and practical benefits that militate toward its use. Present principles therefore recognize that validation of these systems is important prior to making a device incorporating the system available to others, so that the device operates as intended. With this in mind, note that as used below, "primary" optical eye tracking software, algorithms, and/or systems are "primary" in that they are the ones being validated for subsequent implementation in a device that is to then be made available to end-users. As such, the term "primary" as used below is not meant to be limiting in other aspects. Present principles are additionally directed to using a non-living, mechanized robotic head in the general likeness and average size proportions of an actual human being's head. The robot head may include independently-moveable robotic eyes that are configured in structure and appearance like actual human eyes. The robot eyes may then be used for eye tracking system validation. An example illustration of a mechanized head 200 is therefore shown in the schematic diagram of FIG. 2.

Figure 2:
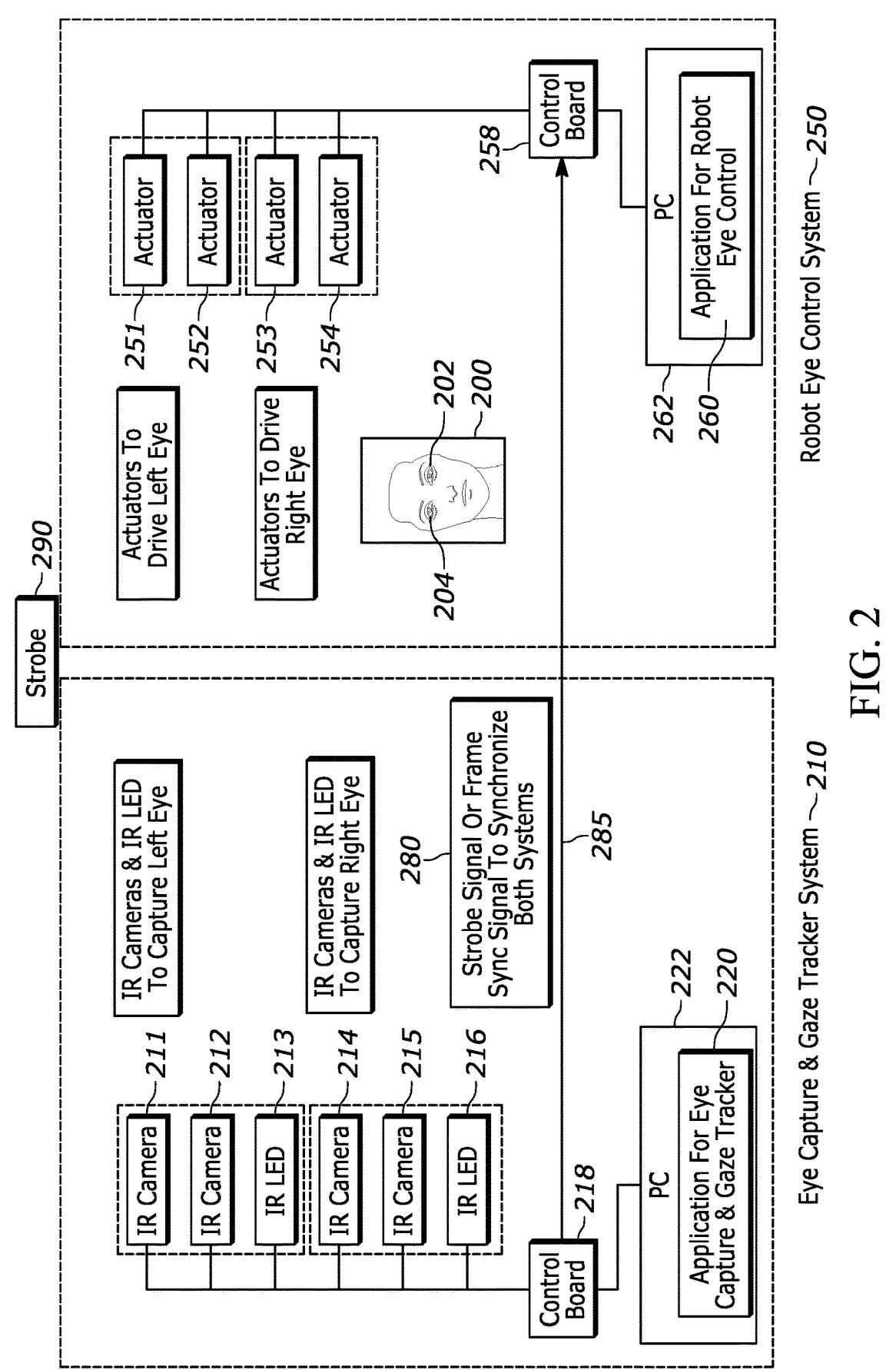
FIG. 2 is a block diagram of an example eye tracking validation system, along with an illustration of a mechanized robot head with two robot eyes that may be used for the validation, consistent with present principles.

As shown, the mechanized head 200 has a left robot eye 202 and a right robot eye 204. FIG. 2 also shows other aspects of a larger system that combines a primary optical eye capture and gaze tracker hardware system 210 with the mechanized robot head hardware system 250 (that itself includes the head 200). Additionally, note for completeness that components of the system 10 of FIG. 1 may be incorporated into either or both of the systems 210, 250 for executing the functions discussed below.

Describing the system 210 in more detail, one or more components thereof may be embodied in a head-mounted device (HMD), such as an augmented reality (AR) headset, virtual reality (VR) headset, or smart glasses. Additionally or alternatively, components of the system 210 may be included in a personal computer like a laptop or desktop computer, a mobile device such as a smartphone, or another type of device including other types of wearable devices.

As also shown in FIG. 2, the system 210 may include left eye infrared (IR) cameras 211, 212 as well as a left eye IR light emitting diode (LED) 213 for tracking the left eye 202. The LED 213 may thus emit IR light directed at the left eye 202 for sensing by one or both of the left eye IR cameras 211, 212 once the IR light reflects off the left eye's pupil/lens (with two cameras in particular being used in some cases for higher-fidelity eye tracking). In examples where an HMD is positioned on the robot head 200 to track the left eye 202 via HMD cameras, the components 211-213 may be located on the HMD at locations that would surround or be adjacent to the left eye 202 when the HMD is placed on the head 200.

Likewise, the system 210 may also include right eye IR cameras 214, 215 and a right eye IR LED 216 for tracking the right eye 204. The LED 216 may thus emit IR light directed at the right eye 204 for sensing by one or both of the right eye IR cameras 214, 215 once the IR light reflects off the right eye's pupil/lens. And here too, in examples where an HMD is positioned on the robot head 200 to track the right eye 204 via HMD cameras, the components 214-216 may be located on the HMD at locations that would surround or be adjacent to the right eye 204 when the HMD is placed on the head 200.

FIG. 2 also shows that the system 210 may include a control board 218 that includes switches and other circuit components. The board 218 may be electrically coupled to and in communication with the components 211-216 to actuate them, possibly under control of an application ("app") 220 executing on a connected laptop computer or other type of personal computer 222. The app 220 may thus control the eye capture of the robot eyes 202, 204 as well as analyze the eyes' gaze points as a gaze tracker. The app 220 may therefore incorporate one or more primary optical eye tracking algorithms for such purposes.

Turning to the robot eye control system 250, it may include left eye actuators 251, 252 that may include electric motors, gears, mechanical linkage, and/or other hardware to move the left eye 202. The actuators 251, 252 may therefore be included inside the head 200 to drive movement of the left eye 202. Similarly, the robot eye control system 250 may include right eye actuators 253, 254 that may include electric motors, gears, sensors, mechanical linkage, and/or other hardware to move the right eye 204. The actuators 253, 254 may therefore also be included inside the head 200, but to drive movement of the right eye 204.

As also shown in FIG. 2, the system 250 may further include a control board 258 that includes switches and other circuit components. The board 258 may be electrically coupled to and in communication with the components 251-254 to actuate them under control of an app 260 executing at a personal computer 262. The app 260 may therefore be preprogrammed to control the eye movements of the robot eyes 202, 204 (including eye speed and angle of orientation). The app 260 may also communicate with various "secondary" eye tracking components, possibly through the board 258, that also track movement of the eyes 202, 204. Example secondary components will be described below in reference to FIGS. 4A-7. As used below, these components are "secondary" in that they are used to validate the primary eye tracking system.

Still in terms of the app 260, note therefore that it may already know the actual angular eye information for the orientations of the eyes 202, 204 owing to that information being received from the actuators 251-254 and/or secondary components themselves. The actual angular information may then be used for eye tracking analysis as discussed in more detail later.

But continuing in reference to FIG. 2, further note that the robot eyes 202, 204 may be commanded to rotate under control of the app 260/board 258 in at least the X and Y dimensions (e.g., move according to a frontal plane for the head 200). In some cases, the eyes 202, 204 may also move under control of the app 260/board 258 in the Z dimension, resulting in six degree of freedom (DOF) eye movement. Six DOF movement may be used in some cases to track not just X-Y eye movement but also depth movement of the eyes 202, 204 within the head to validate a primary eye tracking system that tracks six DOF movement (e.g., like where a user might squint and his/her eyeballs change head depth as a result).

Still in terms of the app 260, in certain non-limiting examples it may be combined with the app 220 into a single multi-purpose app to facilitate processing and data access. Also in some examples, the PCs 222, 262 may be combined into the same PC for much the same reasons.

Still further, while IR cameras 211, 212, 214, and 215 are shown along with IR LEDs 213, 216, in other implementations the cameras 211, 212, 214, and 215 may be red green blue (RGB) cameras and the LEDs 213, 216 may be RGB LEDs. Either way, though one or two cameras may be used as set forth above, in some examples three or four or more cameras may be used for even higher-fidelity eye tracking. Also note that optimal locations for each camera 211, 212, 214, and 215 may be empirically determined (e.g., as located on a particular HMD or distanced from the robot head 200 on another device).

Still in reference to FIG. 2, it is to be understood that for eye tracking validation, the systems 210, 250 may be synchronized so that contemporaneous eye angle data as output by the system 250 may be matched to and analyzed against corresponding gaze images from the system 210 that were generated at the same respective time. For accuracy, this syncing may include synchronization down to an acceptable level of tolerance, such as one millionth of a second.

To synchronize the systems 210, 250 themselves, one or more different techniques may be used. For example, one or more digital frame sync signals may be used to synchronize the two eye tracking systems. The digital frame sync signals may be generated by the app 210/260 and dictate when each set of primary eye tracking system and secondary eye tracking system outputs are to be generated. The frame sync signals may therefore indicate respective same sampling times at which the cameras on the system 210 are to be activated for gathering eye images and at which the secondary components of the system 250 concurrently gather their own readings for the same contemporaneous eye position.

Additionally or alternatively, electronic strobe signals may be used. The electronic strobe signals can be used like the frame sync signals per the paragraph above (e.g., dictate when each set of primary eye tracking system and secondary eye tracking system outputs are to be generated), but may come from a master camera in the system rather than from the app 210/260 like the frame sync signals. The master camera might be one of the cameras 211, 212, 214, or 215, or another camera in the system.

Another technique that may be used involves use of one or more strobe lights that may emit visible strobe light signals. The strobe light signals are used in turn to synchronize the tracking of the movement of the robot eyes 202, 204 via the systems 210 and 250, again dictating when each set of primary eye tracking system and secondary eye tracking system outputs are to be generated. The strobe light signals may therefore indicate a rhythm of respective same sampling times at which the cameras on the system 210 are to be activated for gathering eye images and at which the secondary components of the system 250 concurrently gather their own readings for the same contemporaneous eye position.

Syncing of the systems using one or both techniques may occur through the control boards 218, 258, as illustrated by notation box 280 and data communication channel 285 in FIG. 2. The channel 285 may be wired or wireless and, as such, may use Bluetooth communication, Wi-Fi communication, or another type of communication if wireless. If digital frame sync signals in particular are to be used, the digital signals may be generated by one of the control boards 218, 258, or may be generated by the app 220/260 and then routed to the control boards 218, 258 to control their respective eye tracking components accordingly.

If strobe light signals are to be used, respective cameras on each of the systems 210, 250 may be used to detect light signals from a strobe light 290 that itself might be established by one or more LEDs. The light 290 may emit intermittent light every second, every tenth of a second, or at some other interval that is separated by times of no light emission. Thus, one or more cameras on the system 210 may be used for strobe light detection (e.g., the cameras 211, 212, 214, 215 and/or a separate, dedicated strobe light detection camera), as may one or more cameras on the system 250 (not shown in FIG. 2 for simplicity).

Figure 3:
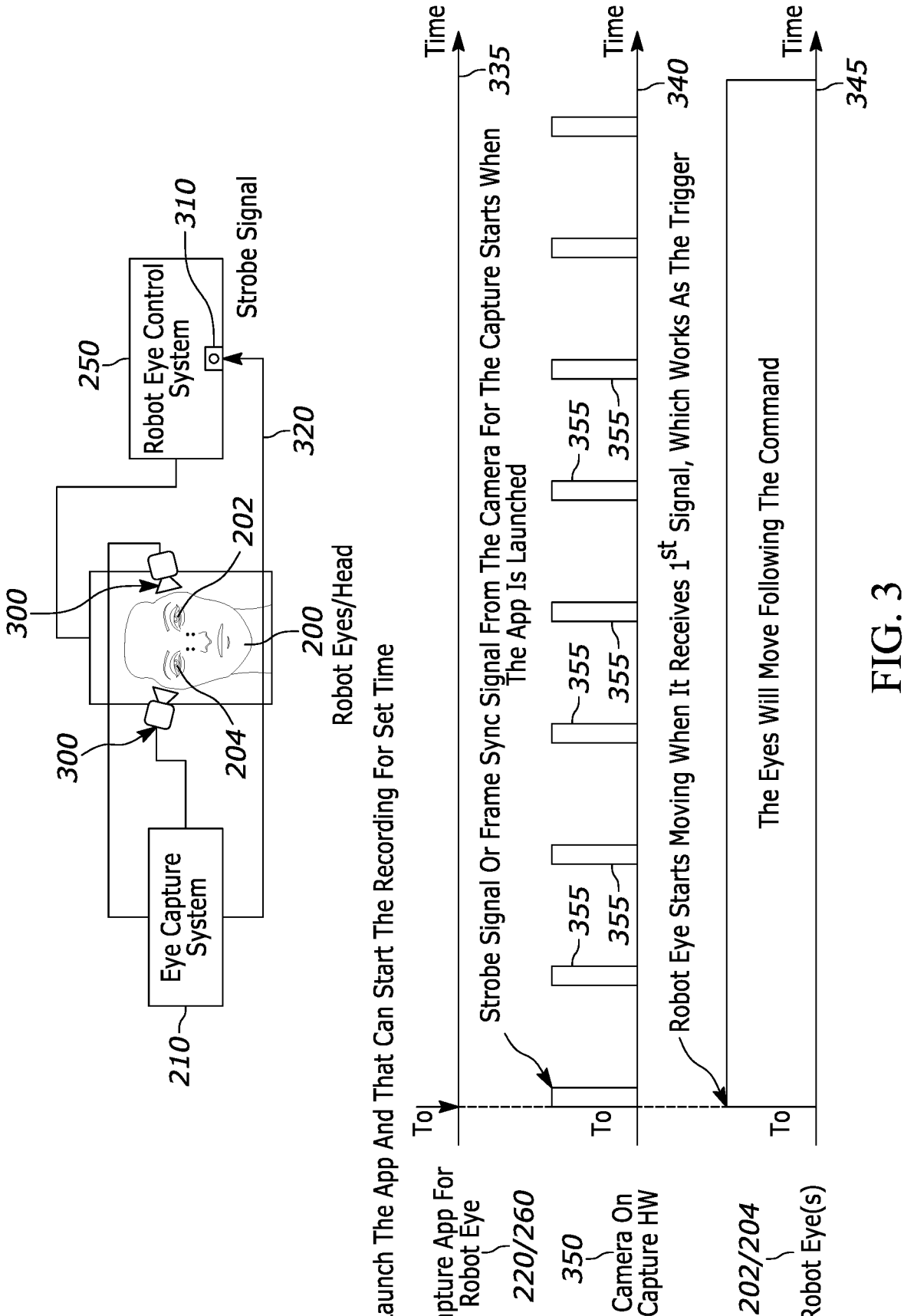
FIG. 3 is a schematic diagram demonstrating different ways that two or more eye tracking systems may be synchronized for validating one of the systems consistent with present principles.

The schematic diagram of FIG. 3 further illustrates in terms of how to synchronize the robot eyes and eye capture systems 250, 210. One or more cameras 300 placed around the robot eyes 202, 204 may be used for detecting strobe light signals via the system 210, where the strobe light signals may be emitted by the system 210 itself. Again note that the cameras 300 may be the same as or different from the cameras 211, 212, 214, and 215. Additionally, the same strobe light signals may also be detected by one or more separate cameras 310 on the system 250, as illustrated by strobe signal path 320.

The lower portion of FIG. 3 also visually demonstrates the interplay between the two systems 210, 250 over time, with the progression of the same timespan being demonstrated by each of the three timelines 335, 340, 345 shown. At time $T_0$, the app(s) 220/260 may be launched and then start the recording to determine a set/start time. Element 350 then indicates that the camera(s) on the capture hardware system 210 (e.g., cameras 211, 212, 214, 215, and/or 300) may output high/low signals or other types of signals based on respective strobe light detection and periods of no light in between. The vertical bars 355 on timeline 340 therefore demonstrate times at which the strobe light signal is detected via the camera(s) (and/or when a digital frame sync signal is received). Also note that in some examples the strobe signals and/or digital frame sync signals may begin being transmitted based on/responsive to the app 220/260 launching.

Further note that the system 250 may begin moving one or both robot eyes 202, 204 based on/responsive to receiving the first frame sync and/or strobe light signals for this particular instance of app execution or app launch. As such, the first frame sync or strobe light signal may establish a trigger for ensuing eye tracking validation as described herein. Timeline 345 therefore indicates robot eye movement over time in response to the trigger (which acts as a start command).

Accordingly, both the robot eye system 250 and capture system 210 may be synchronized. Again note that the systems 210, 250 may be integrated into the same overall system, or may be kept separate. Either way, the app 220/260 may compare the captured IR picture to the actual robot eye position as determined using one or more of the implementations that will be described below in reference to FIGS. 4A-7 below. By syncing each sample set/combination to the same time, optimal accurate eye tracking analysis may be performed to validate the primary eye tracking system. Thus, for example, the actual motor angle/orientation angle of the eyes 202, 204 at different times may be seamlessly matched to respective IR camera images generated at the same respective times once the two systems are synced.

Also note before moving on that the brightness of the light used to emit the strobe light signals may be empirically determined to result in satisfactory or even maximum picture brightness for the resulting images that capture the strobe signals, but still without the images being saturated with the strobe light. This may be done so that eye tracking can still be concurrently performed using the same camera(s) that detect the strobe light signals.

Turning now to FIGS. 4A-7, different example components will be discussed that may be coupled to the robot eyes 202, 204 for sensing ground truth eye movement, eye angle, and/or eye position. Each component may therefore be used as part of the system 250 to generate a first eye tracking output to compare against a second, synced eye tracking output from the primary eye tracking system 210 for eye tracking system validation. This may be done based on the understanding that there may be latency between when the system 250 commands one or both artificial eyes 202, 204 to move and when the corresponding movement actually happens, as that period is not instantaneous. Additionally, not only might latency exist, but also there might generally be some gaps between the programmed position and the actual position due to different elements of the system (including hardware, the control algorithm, etc.). Therefore, actual robot eye position at any given time may be determined other ways using the components of FIGS. 4A-7 to compare the actual robot eye position to an estimated eye position that is output by the primary eye tracking software using its own camera-based eye tracking.

Figure 4B:
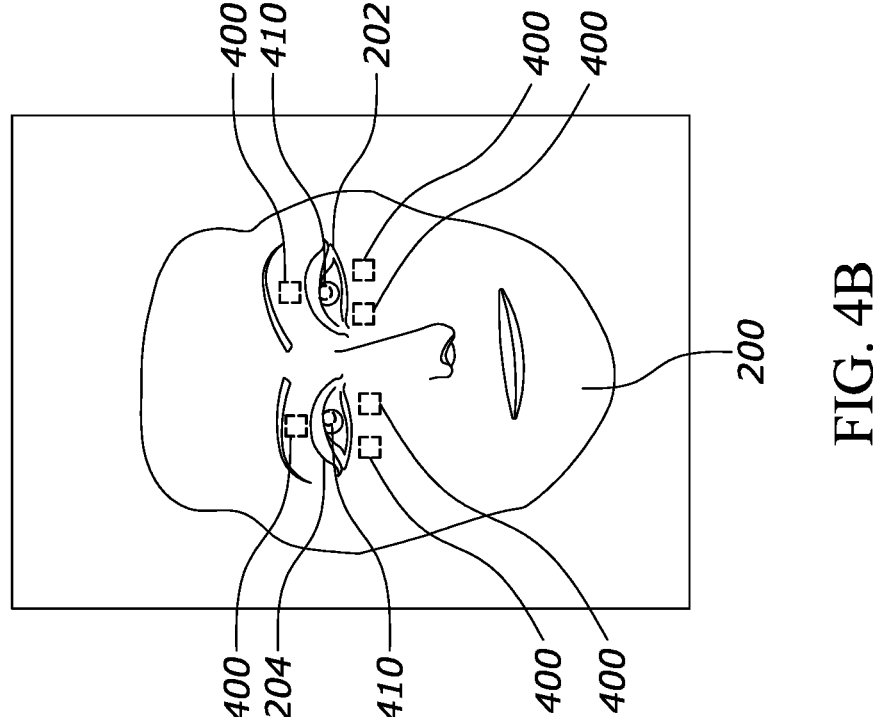
FIGS. 4A and 4B show a mechanized robot head with magnetic sensors around the eyes to validate an optical eye tracking system consistent with present principles.
Figure 4A:
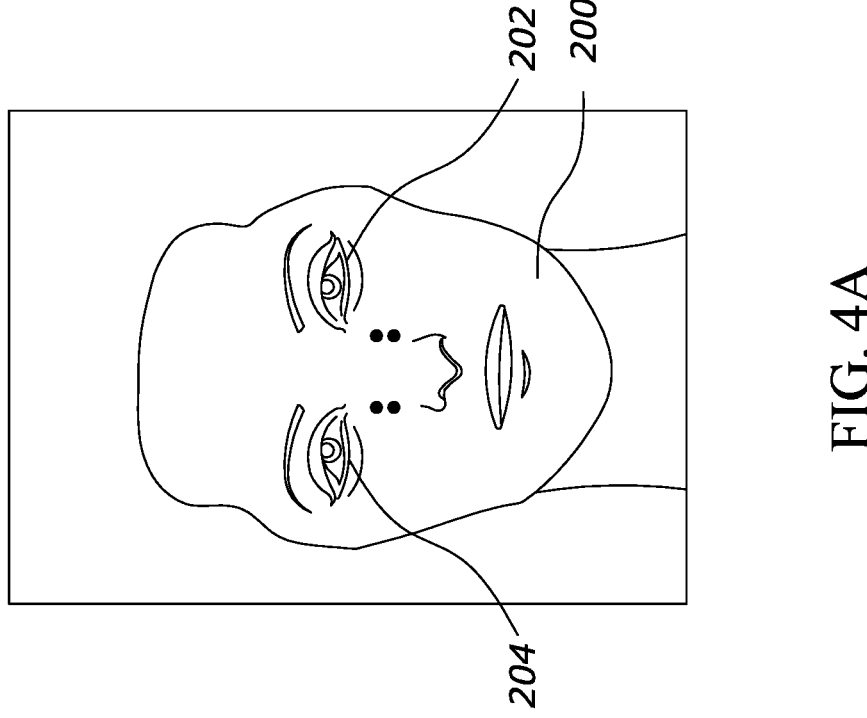

A first example is shown in FIGS. 4A and 4B, where magnetic sensors such as tunnel magneto-resistance (TMR) sensors or Hall effect sensors may be positioned around each eye 202, 204 for the system to determine the absolute position of the robot eye(s) 202, 204. FIG. 4A shows the head 200 itself in close-up front external view, while FIG. 4B shows the head 200 with magnetic sensors 400 embedded under the artificial facial skin of the robot head 200 and around the periphery of each artificial eye 202, 204.

FIG. 4B also shows that a respective magnet 410 may be embedded in each eye 202, 204. Each magnet 410 may be embedded inside the respective eye behind the artificial lens and pupil of that eye so that the magnet 410 does not obstruct an external view of the lens and pupil (since those parts of the eye will also be used for optical eye tracking). However, to get a three-dimensional (3D) location of the pupil of each eye, in other implementations the respective magnet 410 may be located in the 3D geometric center of the pupil itself (including the center in the Z dimension) for tracking via the sensors 400.

The magnets 410 may also have one of their poles facing straight out of the eye through the X-Y center of the pupil for pole tracking via the magnetic sensors 400. This may be done so that the pole direction and pupil's viewing axis are coaxial, enabling accurate validation of a primary eye tracking system that also tracks the pupil.

Or as another example, the direction of the pole for each magnet 410 may face another direction out of the eye, and then an offset from straight ahead may be determined and applied when tracking eye movement via the sensors 400. So, for example, a non-coaxial pole direction might be used if the positions of the sensors 400 results in more accurate tracking from another pole direction than straight out of the pupil.

Furthermore, note that in certain non-limiting embodiments, at least three magnetic sensors 400 may be disposed around each robot eye 202, 204 as shown. This may be done so that a triangulation algorithm may be executed using the measurement values from each of the three sensors 400 to determine the viewing axis and/or exact angle/position of the respective eye by assuming the viewing axis is coaxial with the determined magnetic pole direction. In some examples, each of the three sensors 400 for each eye may even measure magnetic strength in a different one of the three axes (X, Y, and Z dimensions). Additionally, if the distance between the robot eyes and a camera that will be used for primary optical eye tracking is known, this additional data may be useful for eye tracking applications that are 3D space pupil-specific (where knowing absolute eye position in 3D space is helpful).

However, notwithstanding the above, in other examples less than three sensors 400 may be used for each eye. For example, two sensors 400 might be enough to identify magnetic pole orientation in some cases. Or for even higher-fidelity non-optical eye tracking, more than three sensors 400 may be used for each eye in still other implementations.

Also note consistent with FIG. 4B that for applications where an HMD is to be used for primary optical eye tracking, the HMD as placed on the artificial head 200 may also include its own magnetic sensors around the HMD wearer's intended eye locations. This may be done so that not only may gaze direction relative to the head 200 be determined from the magnets 400 embedded in the head

200, but gaze direction relative to the HMD may also be determined using similar magnetic sensors on the HMD. And here too one or more triangulation algorithms may be used to perform eye tracking relative to the HMD using the HMD's own magnetic sensors. Moreover, in some specific examples, only one HMD magnetic sensor may be used for each eye if the power of the magnet is also actively controlled to facilitate pole tracking ability.

It may thus be appreciated based on FIG. 4B that the absolute position of each robot eye 202, 204 may be determined with little to no gap or error. This direct magnetic field sampling implementation may therefore avoid introduction of other gaps or errors by way of the numerous structures (e.g., links, hinges, etc.) that exist between the eye actuators with sensors and the moving eye part that has multiple degrees of freedom (since those structures can otherwise generate their own gap/error due to things such as backlash). Moreover, in example non-limiting embodiments where only one magnet 410 per eye is used, this technique may be particularly advantageous as space within the eye is otherwise limited.

Figure 5:
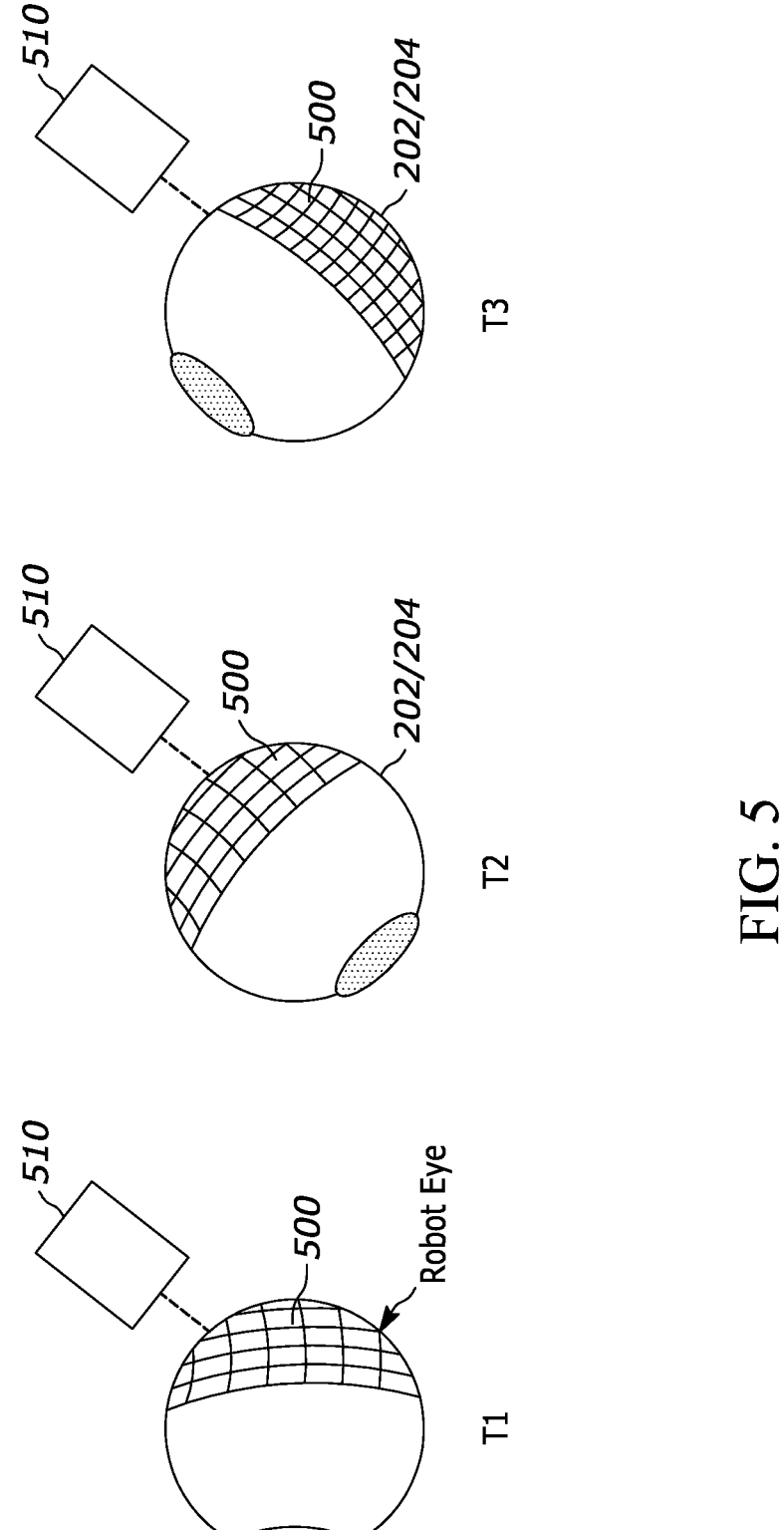
FIG. 5 shows another example where each robot eye has an optical sensor behind it to validate an optical eye tracking system consistent with present principles.

Turning to FIG. 5, another example implementation is shown for a secondary form of eye tracking to compare against a primary optical eye tracking result to validate the primary optical eye tracking system. However, in this case another optical sensor is used.

As shown in FIG. 5, each eye 202/204 may have a textured pattern 500 on the inside. In certain non-limiting embodiments, the pattern 500 may be printed spherically on the inner face of the eye's outside wall. The textured pattern 500 may then be tracked in 3D using an optical sensor 510. The optical sensor 510 may for example be a photo diode/diode array. Additionally or alternatively, the sensor 510 may be a complementary metal oxide semiconductor (CMOS) sensor/CMOS sensor array.

As also shown in FIG. 5, the sensor 510 may be disposed rearward of the robot eye inside the head 200. This may be done so that the texture 500 on the back of the eye can still be tracked but so that the sensor 510 also does not obstruct the primary optical eye tracking that is to be concurrently executed using cameras in front of the eye.

Based on the foregoing, it may be appreciated that outputs from the optical sensor 510 may be used to determine eye rotation based on corresponding, tracked pattern 500 rotation. This in turn may be used to infer pupil orientation/position since the location of the pupil on the robot eye 202/204 relative to the pattern 500 would already be known.

FIG. 5 thus shows that at a first time T1, the robot eye is being tracked while looking straight ahead. Then at time T2, the robot eye is looking downward and hence the pattern 500 is tracked as moving upward using the sensor 510. Then at time T3, the robot eye is looking upward, and hence the pattern 500 is tracked as moving downward using the sensor 510. So here too absolute pupil position may be identified through a secondary eye tracking technique with little to no gap or error. Additionally, the technique of FIG. 5 advantageously permits a wide range of optical sensor types to be used for the sensor 510 while the tracking principle remains the same.

Also note consistent with FIG. 5 that the texture 500 on the back of the eye may be IR transparent and RGB reflective in non-limiting examples. Accordingly, the optical sensor 510 may be an RGB optical sensor that can track the RGB-reflective texture 500 for the secondary eye tracking technique to in turn validate an IR-based primary optical eye tracking system that uses an IR camera. The two different light spectrums and hence two optical eye tracking methods may therefore not interfere with each other. However, for similar reasons, the combination may also be reversed in that the sensor 510 and pattern 500 may be IR-based when the primary eye tracking camera in front of the eye is tracking in RGB.

Also note that while only one sensor 510 might be used per eye, for even higher-fidelity eye tracking, more than one optical sensor 510 may be used per eye. Also in some examples, the pattern 500 may be non-uniform so that different areas of the pattern 500 have different uniquely-identifiable objects to further enhance eye tracking accuracy.

Figure 6:
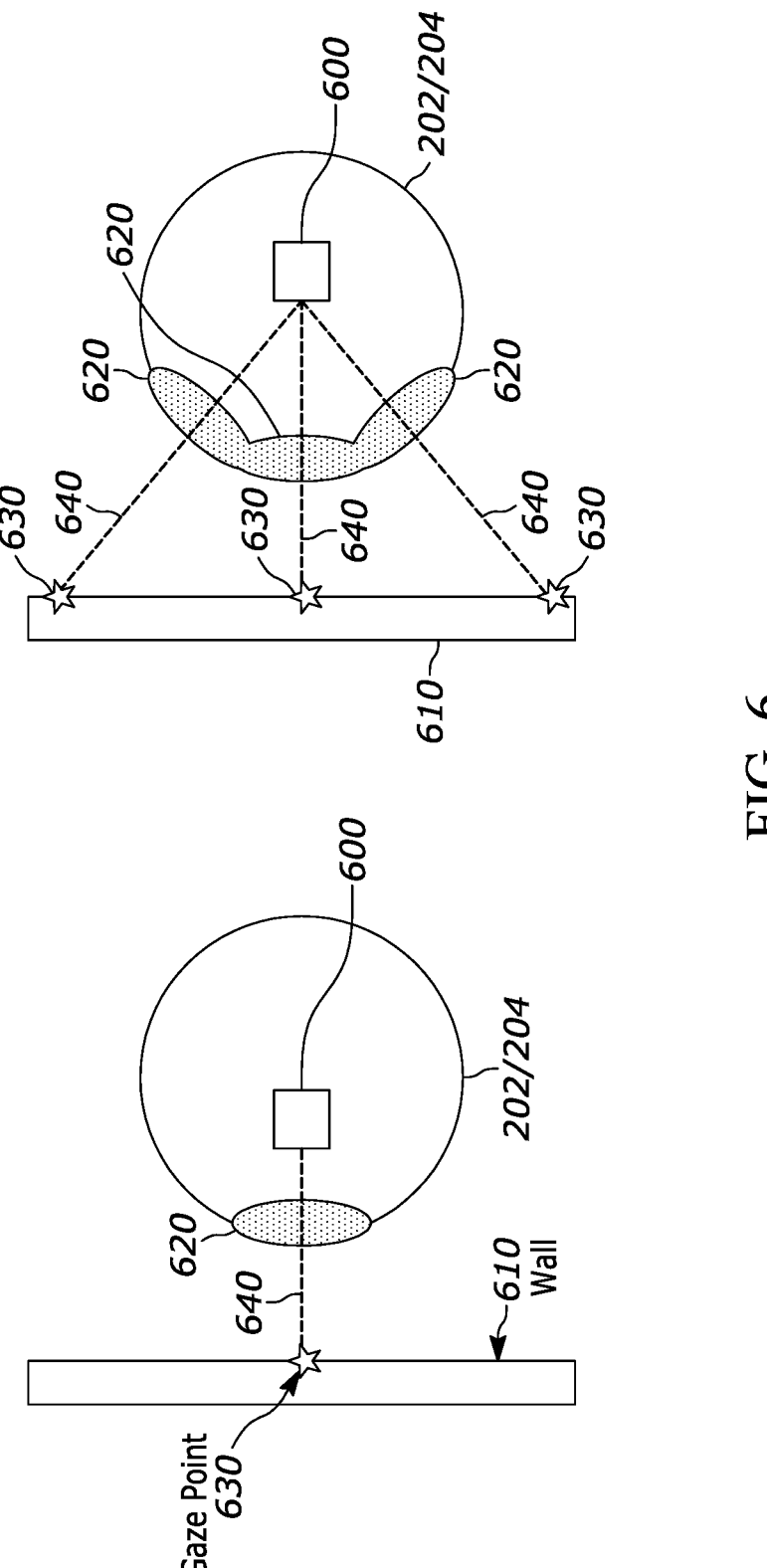

Moving on to FIG. 6, yet another example secondary form of eye tracking is shown that may be used to validate a camera-based primary optical eye tracking algorithm. As shown in this figure, a laser 600 may be disposed within a respective eye 202/204. The laser 600 may be mounted stationary within the eye 202/204 itself (e.g., no independent rotation inside of the eye, relative to the eye). The head 200 may then be placed directly in front of a wall 610 (or other flat vertical face) without an HMD placed on it so that the forward-facing line of sight of the eye 202/204 is orthogonal to the wall 610. The direction of the laser light 640 emitted by the laser 600 may then extend orthogonally out of the X-Y center of the pupil 620 and therefore match the eye's actual line of sight. As such, the gaze point 630 where the laser light 640 hits the wall 610 may be visually identified and then tracked using trigonometry as the eye moves (thus calculating the absolute eye rotation itself).

The right-side example in FIG. 6 therefore shows the pupil 620 at different times, with different corresponding gaze points 630 hitting the wall 610 at different locations. The resulting eye rotation value identified using trigonometry and the laser 600 may then be used to validate a different eye rotation value the system is receiving from the primary optical eye tracking algorithm.

FIG. 7 shows another example similar to FIG. 6 in that a laser 600 may be embedded in an eye 202/204 as described above. However, instead of using the wall 610, a CMOS sensor/sensor array 700 may be placed in front of the eye 202/204. In certain specific examples, the technique of FIG. 7 may be used with an HMD placed on the head 200 and the sensor/array 700 located on the inner display surface of the HMD itself (or even replacing the HMD's display but still generally in a frontal plane in front of the face). The laser light 640 may therefore again be correlated to ground truth line of sight for the eye 202/204, with the CMOS sensor/array 700 detecting the gaze point 630 as it moves about (as shown in the right-side view in FIG. 7). Also note that other types of optical sensors besides a CMOS/CMOS array may also be used consistent with this technique, including a photo diode array for example.

Accordingly, the gaze point 630 where the laser light hits the sensor/array 700 may tracked so that corresponding eye rotation can be identified using trigonometry. The resulting eye rotation value identified using trigonometry and the laser 600 may then be used to validate a different eye rotation value the system is receiving from the primary optical eye tracking algorithm.

It may thus be appreciated based on FIG. 7 that a direct, absolute gaze mapping using the laser 600 may be realized, possibly regardless of other system errors that might otherwise affect eye tracking validation. Also, advantageously the eye gaze may be tracked against the HMD display itself, validating the primary eye tracking method as used in an HMD implementation where a particular emphasis and usefulness is placed on tracking eye gaze toward the HDM's display and correcting for any optical distortion caused by the headset itself.

Furthermore, if the HMD is slightly cockeyed on the head, that does not matter as much according to present principles as the gaze point 630 will still be tracked to a certain particular HMD display location regardless. By getting eye angle relative to the HMD and not just relative to the forward-facing axis of the head 200 itself (and validating a primary eye tracking system accordingly), this too may help circumvent errors that might otherwise creep into the measurement system.

Additionally, note that while the example of FIG. 7 may be used for HMD eye tracking validation in particular, it is not so limited. Indeed, the techniques of FIGS. 4A-7 may each be used for HMD eye tracking validation and/or distanced eye tracking validation (e.g., using a camera distanced from the head when an HMD is not being donned). What's more, in some cases for extra rigor, the other techniques of FIGS. 4A-6 may be used to validate the method of FIG. 7 and vice versa.

Referring now to FIG. 8, it shows example logic that may be executed by a system such as the system 10 and/or individual components thereof (e.g., a personal computer like the computer 222/262) consistent with present principles. In one particular example, some or all of the logic of FIG. 8 may be embodied in the combined app 220/260 described above. And note that while the logic is shown in flow chart format, other suitable logic may also be used.

Beginning at block 800, if not already executing, the system may execute the app that controls movement of the robot eyes 202, 204. The same app may also execute a primary optical eye tracking algorithm that is to be validated/adjusted, and execute a secondary eye tracking algorithm that uses one or more of the techniques mentioned above with respect to FIGS. 4A-7. Thus, while different apps may be executed to perform different respective functions in some examples (e.g., one controlling the robot eye and one performing optical eye tracking), in other non-limiting examples a single app may do so to streamline processing and comparison of the different eye tracking inputs so that the primary eye tracking algorithm may be validated.

From block 800 the logic may then move to block 810. At block 810 the device may synchronize the two eye tracking systems as set forth above with respect to FIGS. 2 and 3. Again note that strobe lights as well as digital frame signals may be used. From block 810 the logic may then proceed to block 820.

At block 820 the device may control one or both of the robot eyes on the robot head to move. The logic may then proceed to block 830 where the device may track movement of the robot eye(s) using one or more components coupled to the robot eye to generate a first eye tracking output. The tracking that occurs at block 830 to render the first eye tracking output may therefore be any of those described above in reference to FIGS. 4A-7. From block 830 the logic may then proceed to block 840.

At block 840 the device may receive input from a camera external to the robot eye, where the camera may be different from the one or more components used at step 830. The logic may then proceed to block 850 where the device may track movement of the robot eye using the input from the external camera and the primary optical eye tracking algorithm to generate a second eye tracking output. From block 850 the logic may then proceed to block 860.

At bock 860, the device may analyze the first eye tracking output and the second eye tracking output to determine an accuracy level of the primary eye tracking algorithm as
executed to track the movement of the robot eye(s) using the
input from the external camera. This might include, for
example, comparing the first eye tracking output to the
second eye tracking output to determine whether the outputs
are the same. If not the same, the device may identify a real
or statistical distance between the two outputs, and thus
determine a level of accuracy of the second output itself
(with more distance correlated to less accuracy). In one
particular example, a loss function may be used to compute
the distance. And note that the first and second outputs
themselves might indicate 3D eye coordinates and/or eye
rotation values in various non-limiting examples.

The device might then, at block 870, identify an offset to
apply to future raw or base outputs from the primary optical
eye tracking algorithm to in turn render an adjusted output
that compensates for one or more inaccuracies in the pri-
mary eye tracking software. This essentially adjusts the
configuration of the primary software itself to output more-
accurate eye tracking outputs in the future.

Additionally or alternatively, at block 870 the device may
adjust one or more parameters of an artificial neural network
establishing some or all of the primary eye tracking software
through machine learning to output more-accurate eye track-
ing outputs in the future. For example, at block 870 the
device may adjust weights and/or biases of one or more
nodes of the artificial neural network. The artificial neural
network itself might be a recurrent neural network, a con-
volutional neural network, or another type of neural net-
work.

As also shown in FIG. 8, note that after block 860 the
device may also present one or more outputs on a display.
The outputs may indicate the accuracy level determined at
block 860. An example display output that may be presented
at block 880 is therefore illustrated in FIG. 9.

Figure 9:
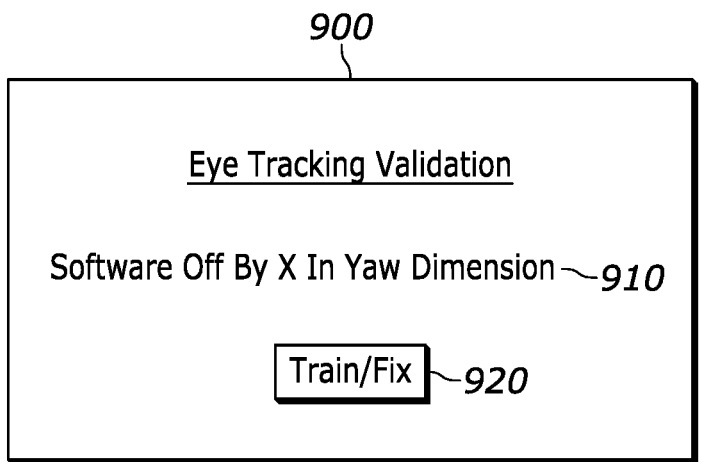
FIG. 9 shows an example graphical user interface (GUI) that may be presented on a display to indicate an accuracy level of an optical eye tracking system consistent with present principles.

As shown in FIG. 9, a graphical user interface (GUI) 900
may be presented and include an indication 910 of a level of
inaccuracy (e.g., distance or loss) in the primary optical eye
tracking software so that a technician or developer can
analyze the result. If warranted, that person can then select
the train/fix selector 920 to command the system to under-
take functions described above in reference to block 870 to
adjust the configuration of the primary optical eye tracking
software to output more-accurate eye tracking outputs in the
future. However, further note that in other examples the
electronic system may adjust the configuration autono-
mously responsive to identifying an inaccuracy without
receiving additional user input to do so.

While the particular embodiments are herein shown and
described in detail, it is to be understood that the subject
matter which is encompassed by the present invention is
limited only by the claims.

What is claimed is:

1. An apparatus comprising:
   a memory comprising computer-executable instructions;
   and
   a processor assembly configured to access the memory
   and execute the computer-executable instructions to
   perform operations comprising:
   receiving, from a magnetic sensor and a laser posi-
   tioned in a robot eye, first eye tracking data associ-
   ated with movement of the robot eye;
   generating, based at least in part on the first eye
   tracking data, a first eye tracking output;
   receiving, from a second sensor of an eye tracking
   system external to the robot eye, second eye tracking
   data associated with movement of the robot eye;

generating, based at least in part on the second eye
tracking data, a second eye tracking output; and
determining an accuracy level of the eye tracking
system by comparing the first eye tracking output to
the second eye tracking output.

2. The apparatus of claim 1, wherein the memory com-
prises additional computer-executable instructions and the
processor assembly is further configured to access the
memory and execute the additional computer-executable
instructions to perform additional operations comprising
present an output on a display, the output indicating the
accuracy level.

3. The apparatus of claim 1, wherein the memory com-
prises additional computer-executable instructions and the
processor assembly is further configured to access the
memory and execute the additional computer-executable
instructions to perform additional operations comprising
based at least in part on the accuracy level, adjust one or
more parameters of the eye tracking system.

4. The apparatus of claim 1, wherein receiving the first
eye tracking data includes receiving the first eye tracking
data from at least three second magnetic sensors disposed
around the robot eye.

5. The apparatus of claim 1, wherein the magnetic sensor
comprise tunnel magneto-resistance (TMR) sensors.

6. The apparatus of claim 1, wherein receiving the first
eye tracking data includes receiving the first eye tracking
data from an optical sensor different from the second sensor.

7. The apparatus of claim 6, wherein the optical sensor is
disposed rearward of the robot eye.

8. The apparatus of claim 6, wherein the optical sensor
comprises a complementary metal oxide semiconductor
(CMOS) sensor.

9. The apparatus of claim 6, wherein the robot eye
comprises a textured pattern trackable via the optical sensor.

10. The apparatus of claim 1, wherein receiving the first
eye tracking data includes receiving the first eye tracking
data from one or more optical sensors that track light from
the laser.

11. The apparatus of claim 10, wherein the one or more
optical sensors comprise one or more complementary metal
oxide semiconductor (CMOS) sensors.

12. The apparatus of claim 1, wherein the memory com-
prises additional computer-executable instructions and the
processor assembly is further configured to access the
memory and execute the additional computer-executable
instructions to perform additional operations comprising
synchronizing, using one or more digital frame sync signals,
tracking of the movement of the robot eye based at least in
part on the first eye tracking data with tracking of movement
of the robot eye based at least in part on the second eye
tracking data.

13. The apparatus of claim 1, wherein the memory com-
prises additional computer-executable instructions and the
processor assembly is further configured to access the
memory and execute the additional computer-executable
instructions to perform additional operations comprising
synchronizing, using a strobe light, tracking of the move-
ment of the robot eye based at least in part on the first eye
tracking data with tracking of movement of the robot eye
based at least in part on the second eye tracking data.

14. The apparatus of claim 1, further comprising a mecha-
nized head that comprises the robot eye.

15. A computer-implemented method comprising:

receiving, by an electronic system from a magnetic sensor and a laser positioned in an artificial eye, first eye tracking data associated with movement of the artificial eye;

generating, by the electronic system, based at least in part on the first eye tracking data, a first eye tracking output;

receiving, by the electronic system from a second sensor of an eye tracking system external to the artificial eye, second eye tracking data associated with movement of the artificial eye;

generating, by the electronic system, based at least in part on the second eye tracking data, a second eye tracking output;

determining, by the electronic system, an accuracy level of eye tracking software that is executed to track the movement of the artificial eye by comparing the first eye tracking output to the second eye tracking output; and adjusting, by the electronic system, based at least in part on the accuracy level, the eye tracking software.

16. One or more non-transitory computer-readable media comprising computer-executable instructions that, when executed by one or more processors of an electronic system, cause the electronic system to perform operations comprising:

receiving, from a magnetic sensor and a laser positioned in an artificial eye, first eye tracking data associated with movement of the artificial eye;

generating, based at least in part on the first eye tracking data, a first eye tracking output;

receiving, from a second sensor of an eye tracking system external to the artificial eye, second eye tracking data associated with movement of the artificial eye;

generating, based at least in part on the second eye tracking data, a second eye tracking output;

determining an accuracy level of eye tracking software that is executed to track the movement of the artificial eye by comparing the first eye tracking output to the second eye tracking output; and adjusting, based at least in part on the accuracy level, a parameter of the eye tracking software.

17. The computer-implemented method of claim 15, further comprising synchronizing, based at least in part on the accuracy level, tracking of the movement of the artificial eye based at least in part on the first eye tracking data with tracking of movement of the artificial eye based at least in part on the second eye tracking data.

18. The one or more non-transitory computer-readable media of claim 16, further comprising additional computer-executable instructions that, when executed by the one or more processors, cause the electronic system to perform additional operations comprising synchronizing, based at least in part on the accuracy level, tracking of the movement of the artificial eye based at least in part on the first eye tracking data with tracking of movement of the artificial eye based at least in part on the second eye tracking data.

19. The computer-implemented method of claim 15, wherein receiving the first eye tracking data includes receiving the first eye tracking data from one or more optical sensors that track light from the laser.

20. The one or more non-transitory computer-readable media of claim 16, wherein receiving the first eye tracking data includes receiving the first eye tracking data from one or more optical sensors that track light from the laser.

* * * * *